(12) United States Patent
Itai (10) Patent No.: US 11,211,647 B2
(45) Date of Patent: Dec. 28, 2021

(54) ONBOARD BATTERY

(71) Applicant: SUBARU CORPORATION, Tokyo (JP)

(72) Inventor: Keisuke Itai, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 416 days.

(21) Appl. No.: 16/208,874

(22) Filed: Dec. 4, 2018

(65) Prior Publication Data

US 2019/0296408 A1    Sep. 26, 2019

(30) Foreign Application Priority Data

Mar. 26, 2018 (JP) .............................. JP2018-057695

(51) Int. Cl.
| | |
|---|---|
| *H01M 10/613* | (2014.01) |
| *H01M 2/02* | (2006.01) |
| *H01M 2/10* | (2006.01) |
| *H01M 50/10* | (2021.01) |
| *H01M 50/20* | (2021.01) |

(52) U.S. Cl.
CPC ......... *H01M 10/613* (2015.04); *H01M 50/10* (2021.01); *H01M 50/20* (2021.01)

(58) Field of Classification Search
CPC ..................................... H01M 10/6561–6566
See application file for complete search history.

(56) References Cited

U.S. PATENT DOCUMENTS

| | | |
|---|---|---|
| 2012/0009446 A1 | 1/2012 | Mizuguchi |
| 2013/0078496 A1 | 3/2013 | Lim et al. |
| 2013/0202936 A1 | 8/2013 | Kosaki et al. |
| 2014/0308559 A1 | 10/2014 | Hwang |
| 2016/0211560 A1 | 7/2016 | Hara |
| 2016/0211561 A1* | 7/2016 | Nakagawa ........ H01M 10/6566 |

FOREIGN PATENT DOCUMENTS

| | | |
|---|---|---|
| JP | H07-15160 U | 3/1995 |
| JP | H08-310256 A | 11/1996 |
| JP | 2005-019231 A | 1/2005 |

(Continued)

OTHER PUBLICATIONS

Japanese Office Action, dated Sep. 10, 2019, in Japanese Application No. 2018-657695 and English Translation thereof.

*Primary Examiner* — Stephan J Essex (74) *Attorney, Agent, or Firm* — McGinn I.P. Law Group, PLLC.

(57) ABSTRACT

An onboard battery includes battery modules each containing battery cells, a housing case that houses the battery modules, and an air intake duct configured to send cooling air into the modules. Of the battery modules, at least two are disposed apart from each other in a vertical direction and at least two are disposed apart from each other in a front-rear direction. Cooling air is taken into the battery modules from rear via the air intake duct. Cooling air taken into the battery modules is emitted to an internal space of the housing case. A rear portion of the housing case is provided with an exhaust hole configured to let out cooling air emitted from the battery modules to the internal space. Of emission flows of cooling air emitted from the battery modules, the emission flow of cooling air from at least one of the modules disposed most forward is the largest.

20 Claims, 8 Drawing Sheets

(56) References Cited

FOREIGN PATENT DOCUMENTS

| | | | |
|---|---|---|---|
| JP | 2006-318820 | A | 11/2006 |
| JP | 2010-015931 | A | 1/2010 |
| JP | 2010-225344 | A | 10/2010 |
| JP | 2011-020637 | A | 2/2011 |
| JP | 2012-054054 | A | 3/2012 |
| JP | 2012-164473 | A | 8/2012 |
| JP | 2012-199205 | A | 10/2012 |
| JP | 2013-048083 | A | 3/2013 |
| JP | 2013-071729 | A | 4/2013 |
| JP | 5206110 | B2 | 6/2013 |
| JP | 2013-193635 | A | 9/2013 |
| JP | 2014-035969 | A | 2/2014 |
| JP | 2014-093207 | A | 5/2014 |
| JP | 2014093207 | A * | 5/2014 |
| JP | 2014-203600 | A | 10/2014 |
| JP | 2016-132314 | A | 7/2016 |
| JP | 2016-134243 | A | 7/2016 |
| JP | 2016-137880 | A | 8/2016 |

* cited by examiner

ND BATTERY

CROSS REFERENCES TO RELATED APPLICATIONS

The present application claims priority from Japanese Patent Application No. 2018-057695 filed on Mar. 26, 2018, the entire contents of which are hereby incorporated by reference.

BACKGROUND

1. Technical Field

The present invention relates to a technical field regarding an onboard battery that is to be mounted on a vehicle such as an automobile.

2. Related Art

Various vehicles, such as automobiles, are provided with vehicular batteries for supplying electric power to electric motors and various other electrical component parts In recent years, in particular, vehicles that use electric power as motive power, such as electric vehicles (EVs) and hybrid electric vehicles (HEVs), are becoming widely used. These fully or partly electrically powered vehicles are provided with vehicular batteries that have high electricity storage function.

An onboard battery is made up of a housing case and a battery module housed in the housing case. A battery module contains, for example, an arrangement of battery cells (secondary batteries), such as nickel metal hydride batteries or lithium ion batteries. Furthermore, in vehicular batteries that are mounted in electric vehicles and the like, a plurality of battery modules are disposed in a housing case and the individual battery cells of the battery modules are coupled in series or parallel.

Some of such vehicular batteries have an arrangement for securing high electricity storage function in which battery modules are disposed in a pair of upper and lower tiers in the housing case (see, e.g., Japanese Patent No. 5206110).

An onboard battery described in Japanese Patent No. 5206110 is disposed in a luggage compartment in a rear portion of a vehicle in such a manner that the lower-tier battery module is inserted in a recess portion that is formed in a floor panel and that has an upper opening. This configuration secures a large space for the luggage compartment.

SUMMARY OF THE INVENTION

An aspect of the invention provides an onboard battery including: battery modules in each of which a battery cell is disposed; a housing case that houses the battery modules; and an air intake duct configured to send cooling air into the battery modules. Of the battery modules, at least two are disposed apart from each other in a vertical direction and at least two are disposed apart from each other in a front-rear direction. Cooling air is taken into the battery modules from rear via the air intake duct. Cooling air taken into the battery modules is emitted to an internal space of the housing case. A rear portion of the housing case is provided with at least one exhaust hole for letting out the cooling air emitted from the battery modules to the internal space of the housing case. Of emission flows of the cooling air emitted from the battery modules to the internal space of the housing case, the emission flow of the cooling air emitted from at least one of the battery modules which is disposed at the most forward location is the largest.

DETAILED DESCRIPTION

In the following, some preferred examples of the present invention are described in detail with reference to the accompanying drawings. Note that the following description is directed to illustrative instances of the disclosure and not to be construed as limiting to the present invention. Factors including, without limitation, numerical values, dimensions, shapes, materials, components, positions of the components, and how the components are coupled to each other are for purposes of illustration to give an easier understanding of the present invention, and are not to be construed as limiting to the present invention, unless otherwise specified. Further, elements in the following instances which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same minerals to avoid redundant description. Illustration of elements that are not directly related to the present invention is omitted. In an onboard battery mounted in a vehicle, since the battery cells produce heat at the time of driving the vehicle, the battery cells need to be cooled to reduce or inhibit the temperature increase caused by the heat production of the battery cells so as to secure good performance of the battery cells and various control devices disposed within the housing case. However, when a complicated exhaust path is provided within the housing case, smooth exhaustion may become difficult to secure, leading to a possibility of failing to secure sufficient cooling performance.

Particularly in an onboard battery made up of a plurality of battery modules as described above, a large quantity of heat is produced, making it more desirable to secure smooth exhaustion and therefore improve the efficiency in cooling the battery modules.

Therefore, it is desirable to provide an onboard battery that secures smooth emission of cooling air and therefore improves the efficiency in cooling the battery cells.

An onboard battery 1 includes a housing case 2 and battery modules 3, 3, . . . (see FIGS. 1 to 3). The onboard battery 1 is disposed, for example, in a luggage compartment (or trunk) of a vehicle.

The housing case 2 has a housing portion 4 that has an upper opening and a flat platy lid 5 that closes the opening of the housing portion 4 from above.

The housing portion 4 has a front portion 6 disposed in rear of a rear seat of the vehicle, a rear portion 7 disposed in rear of the front portion 6, side portions 8 and 8 disposed apart from each other in a right-left or lateral direction, and a bottom portion 9 that faces in a vertical direction.

Figure 3:
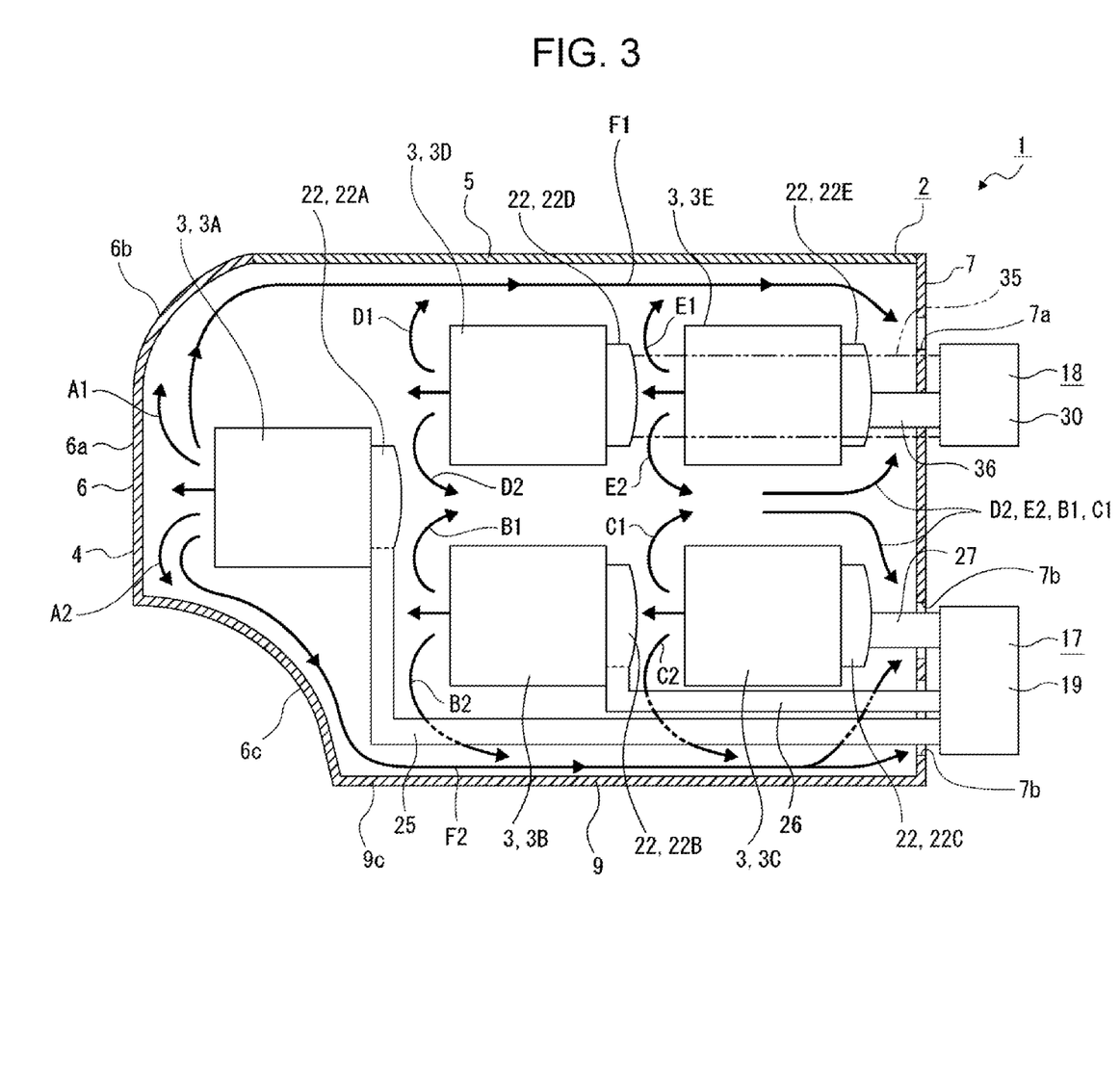
FIG. 3 is a schematic diagram illustrating, for example, how battery modules of an onboard battery are arranged.

As illustrated in FIG. 3, an intermediate portion of the front portion 6 in the vertical direction is provided as a flat portion 6a that faces in a front-rear direction, a portion of the front portion 6 above the flat portion 6a is provided as an upper inclined portion 6b that is inclined so as to extend farther rearward with increasing distance upward from the flat portion 6a, and a portion thereof below the flat portion 6a is provided as a lower inclined portion 6c that is inclined so as to extend farther rearward with increasing distance downward from the flat portion 6a.

A lower end of the upper inclined portion 6b is continuous with an upper end of the flat portion 6a and an upper end of the lower inclined portion 6c is continuous with a lower end of the flat portion 6a. The upper inclined portion 6b has, for example, a curved shape that is curved to be convex or protruded diagonally forward and upward and the lower inclined portion 6c has, for example, a curved surface that is curved to be convex or protruded diagonally rearward and upward.

Figure 1:
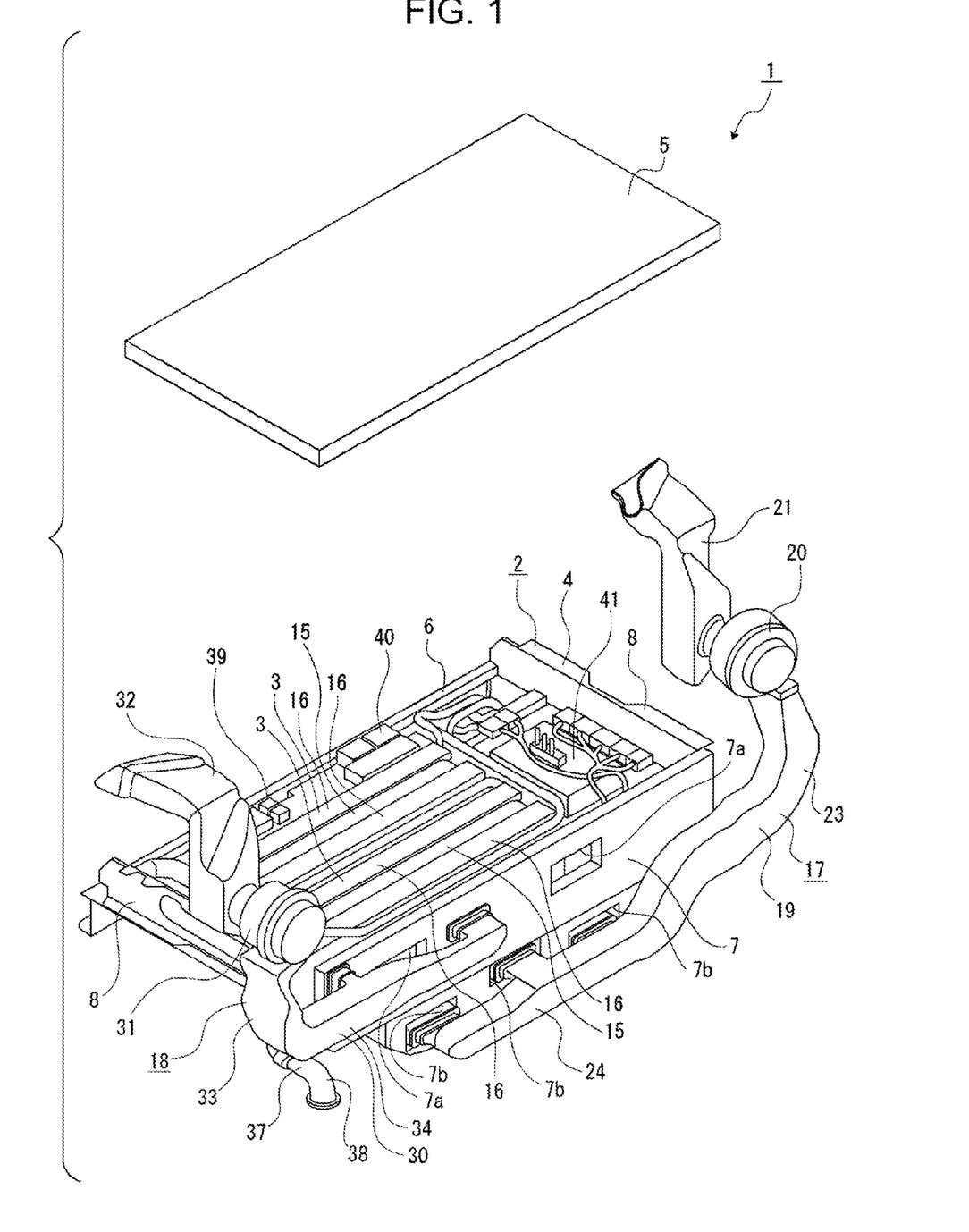
FIG. 1 is a perspective view of an example of an onboard battery, illustrating, together with FIGS. 2 to 12, an onboard battery according to the invention.
Figure 2:
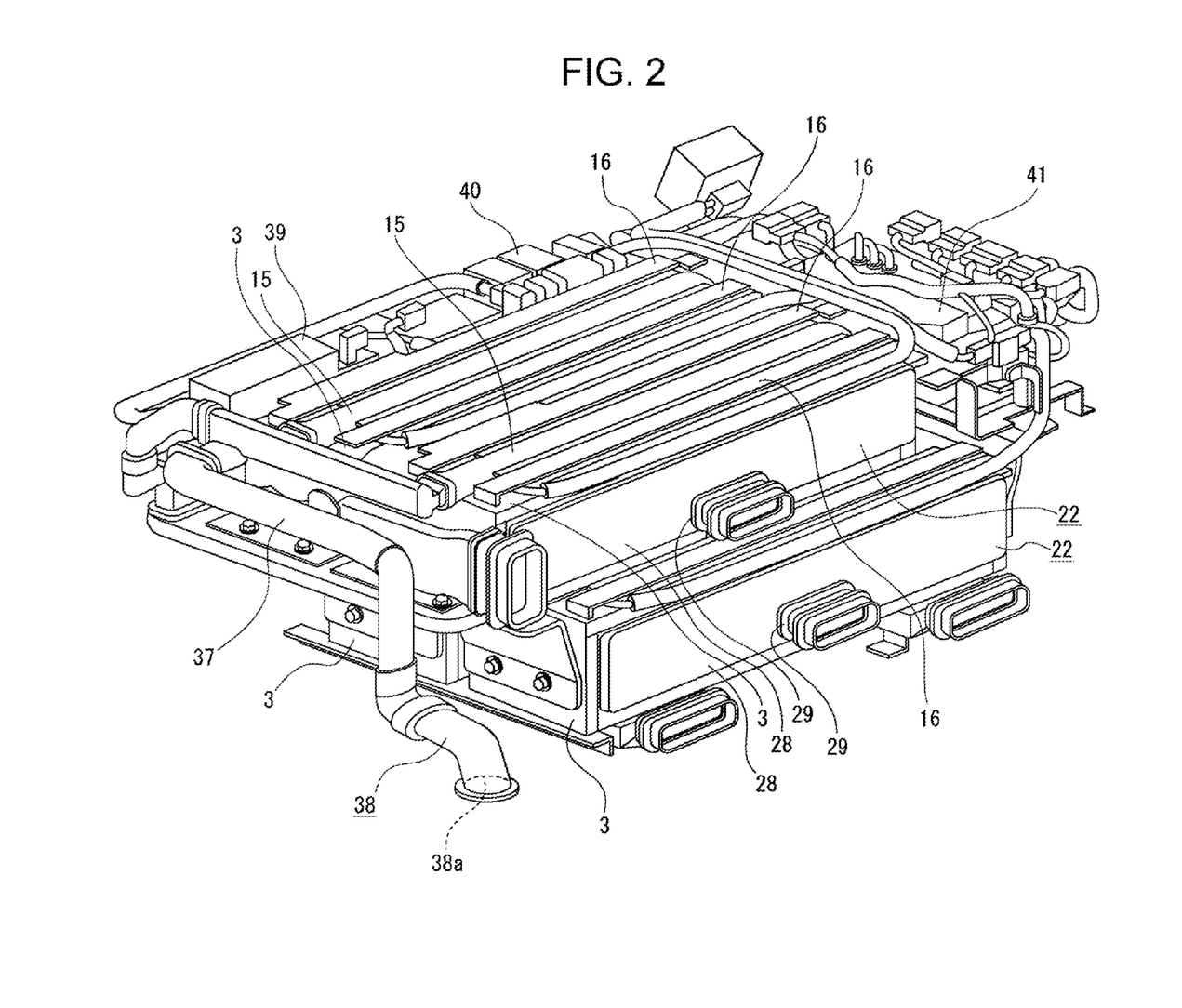
FIG. 2 is a perspective view of an onboard battery from which portions of the battery have been omitted.

The rear portion 7 has exhaust holes 7a and 7a, and exhaust holes 7b, 7b, and 7b (see FIGS. 1 to 3). The exhaust holes 7a and 7a are provided at an upper end side of the rear portion 7 and apart from each other in the right-left direction and the exhaust holes 7b, 7b, and 7b are provided at a lower end side of the rear portion 7 and apart from one another in the right-left direction.

As for the battery modules 3, 3, . . . , for example, five battery modules are disposed in an arrangement in the front-rear and vertical directions within the housing case 2. Specifically, the five battery modules 3, 3, . . . in this example are a first battery module 3A positioned most forward, a second battery module 3B positioned at a rear side of the first battery module 3A, a third battery module 3C positioned at the rear side of the second battery module 3B, a fourth battery module 3D positioned at the rear side of the first battery module 3A and directly above the second battery module 3B, and a fifth battery module 3E positioned at the rear side of the fourth battery module 3D and directly above the third battery module 3C.

The first battery module 3A, the second battery module 3B, the third battery module 3C, the fourth battery module 3D, and the fifth battery module 3E are coupled in series by electric wires.

Figure 4:
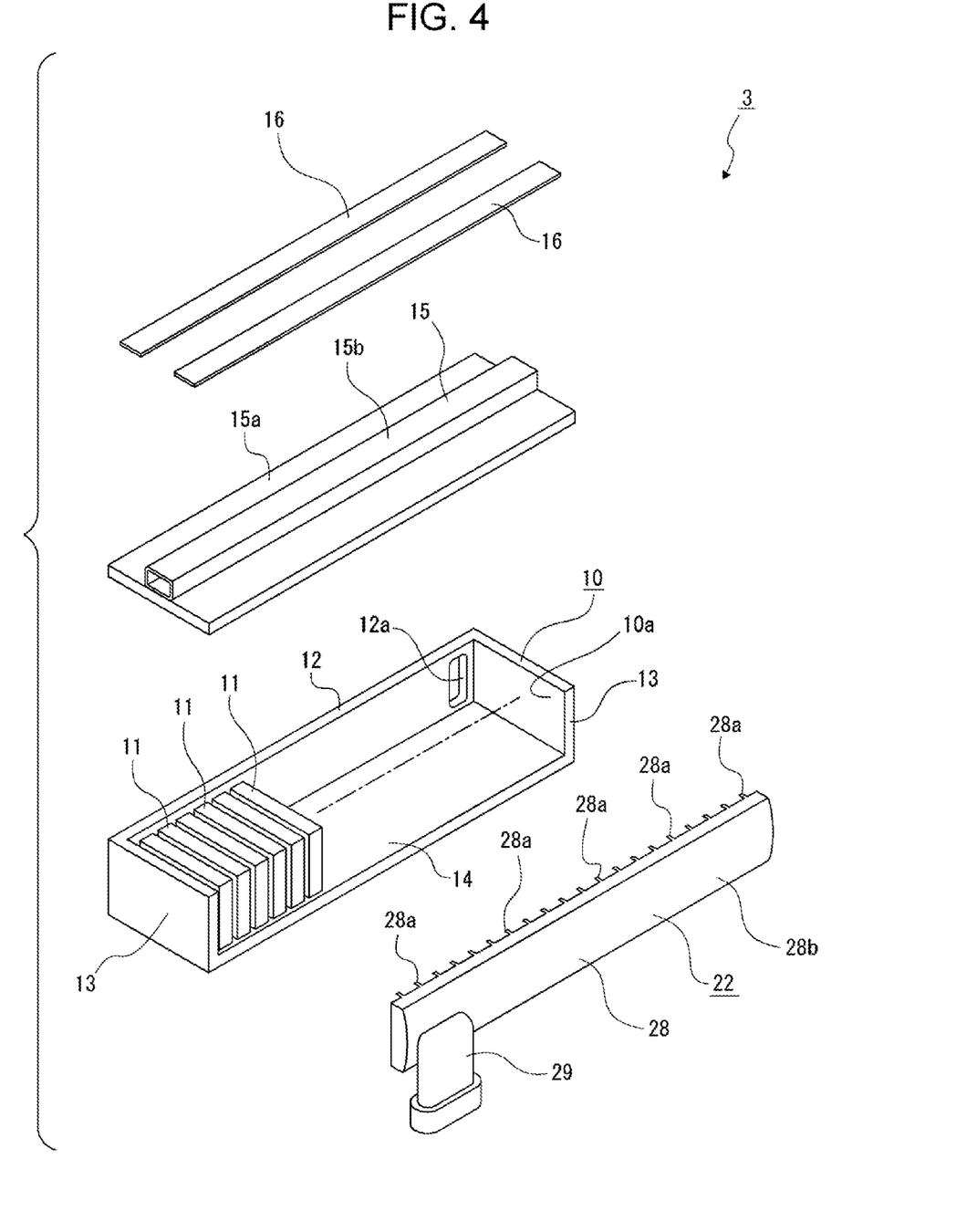
FIG. 4 is a schematic exploded perspective view of a battery module and a joint duct.

Each battery module 3 includes a case body 10 and a plurality of battery cells 11, 11, . . . housed within the case body 10 (see FIG. 4).

The case body 10 has a laterally elongated box shape that is open upward and rearward and that is defined by a laterally elongated front surface portion 12 that faces in the front-rear direction, side surface portions 13 and 13 that face in the right-left direction and are apart from each other in the right-left direction, and a laterally elongated bottom surface portion 14 that faces in the vertical direction. An internal space of the case body 10 is formed as a housing space 10a.

The front surface portion 12 has in one of a right end portion, a left end portion, and a central portion in the right-left direction a release hole 12a that penetrates the front surface portion 12 in the front-rear direction. Concretely, the first battery module 3A has a release hole 12a formed, for example, in a right end portion of its front surface portion 12, the second battery module 3B has a release hole 12a formed, for example, in a left end portion of its front surface portion 12, the third battery module 3C has a release hole 12a formed, for example, in a central portion of its front surface portion 12 in the right-left direction, a fourth battery module 3D has a release hole 12a formed, for example, in a right end portion of its front surface portion 12, and a fifth battery module 3E has a release hole 12a formed, for example, in a central portion of its front surface portion 12 in the right-left direction. FIG. 4 illustrates an example in which a release hole 12a is formed in a right end portion of the front surface portion 12.

The battery cells 11, 11, . . . are housed within the housing space 10a, for example, in a state in which the battery cells 11, 11, . . . are aligned at equal intervals in the right-left direction in such an orientation that the direction of thickness of the battery cells 11, 11, . . . coincides with the right-left direction, and are thus supported in the case body 10. When the battery cells 11, 11, . . . are supported in the case body 10, the battery cells 11, 11, . . . are spaced from each other by constant clearances. The battery cells 11, 11, . . . are coupled in series.

A cover 15 having a laterally elongated shape is attached to the case body 10. The cover 15 includes a base plate member 15a that faces in the vertical direction and a tube-shaped portion 15b that is positioned on an upper surface of the base plate member 15a. The tube-shaped portion 15b is positioned at a central portion of the base plate member 15a in the front-rear direction. The cover 15 is attached to the case body 10 in such a manner that the base plate member 15a closes the upper opening of the case body 10.

The central portion of the cover 15 in the front-rear direction is provided with penetrating gas flow holes (not illustrated) that each extend in the vertical direction and that are aligned at equal intervals in the right-left direction. The gas flow holes of the cover 15 are each positioned directly over the battery cells 11, 11, . . . .

As for the cover 15, a pair of front and rear sides of the tube-shaped portion 15b are provided with substrates 16 and 16 that each have a laterally elongated shape. Electric wires are coupled to the substrates 16 and 16, so that, using electric wires and the substrates 16 and 16, electrical control or the like is performed on the battery cells 11, 11, . . . .

Each of the battery cells 11, 11, . . . is provided with a valve (not illustrated) capable of communication with an interior of the battery cell 11. Each valve communicates with a corresponding one of the gas flow holes of the cover 15. If abnormality should occur in a battery cell 11, gas may sometime be produced inside the battery cell 11. The production of gas will increase the internal pressure in the battery cell 11, so that the valve becomes open, allowing produced gas to flow out via the valve and the gas flow hole into the tube-shaped portion 15b.

The battery modules 3, 3, . . . are each mounted in the housing case 2 via a mounting plate (not illustrated) and disposed at predetermined position (see FIG. 3). The second battery module 3B and the third battery module 3C are disposed in a lower tier, the fourth battery module 3D and the fifth battery module 3E are disposed in an upper tier, and the first battery module 3A is disposed in an intermediate tier relative to the second battery module 3B and the third battery module 3C in the lower tier and to the fourth battery module 3D and the fifth battery module 3E in the upper tier. It is to be noted that the first battery module 3A may be disposed in the same lower tier as the second battery module 3B and the third battery module 3C or may also be disposed in the same upper tier as the fourth battery module 3D and the fifth battery module 3E.

When the battery modules 3, 3, . . . are driven, cooling air is taken into the battery modules 3, 3, . . . by a first air intake unit 17 and by a second air intake unit 18 (see FIGS. 1, 3, 5, and 6).

Figure 5:
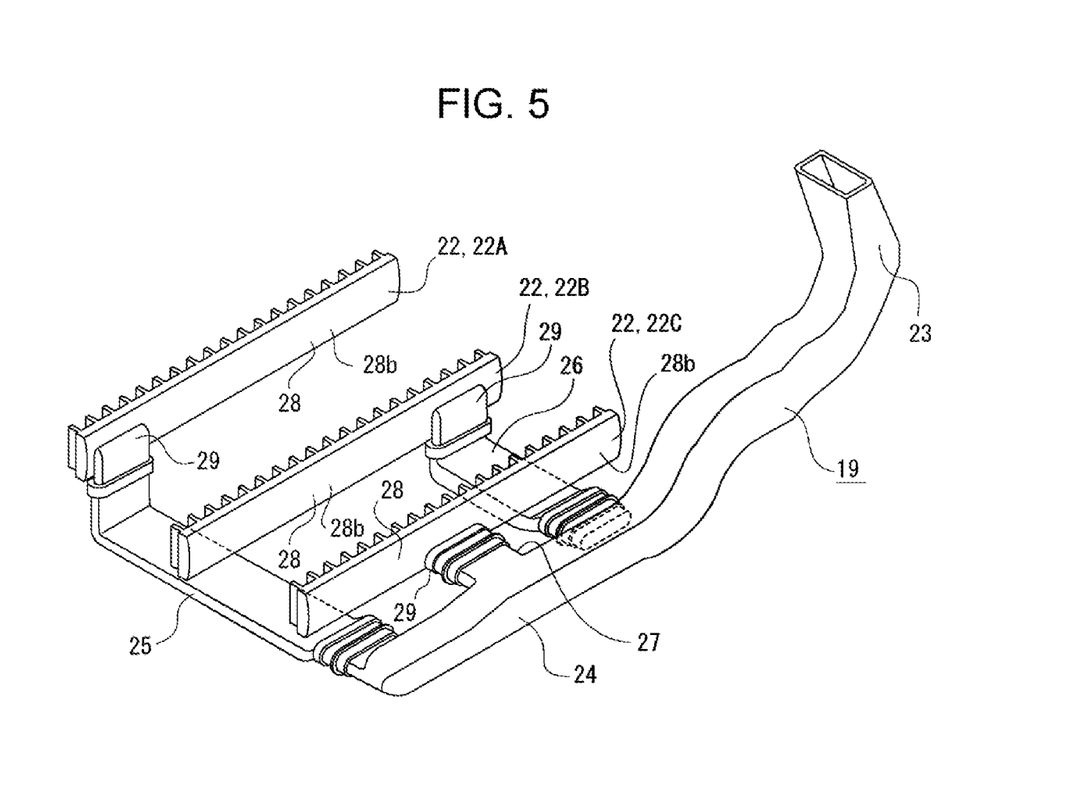
FIG. 5 is a perspective view of a first cooling unit.

The first air intake unit 17 includes a first air intake duct 19, a first air intake fan 20, a first intake pipe 21, and joint ducts 22, 22, and 22 (see FIGS. 1 and 5).

The first air intake duct 19 has a function of sending cooling air into the first battery module 3A, the second battery module 3B, and the third battery module 3C. The first air intake duct 19 includes an intake portion 23, an intermediate portion 24, a first inflow portion 25, a second inflow portion 26, and a third inflow portion 27.

The intake portion 23 is continuous with the intermediate portion 24. The intake portion 23 is located at a higher or upper side of, that is, higher than, the intermediate portion 24. The intermediate portion 24 is positioned in a substantially horizontal posture at the rear side of a lower half of the housing case 2.

As for the first inflow portion 25, a portion other than a front end portion extends in the front-rear direction and the front end portion is bent upward relative to the other portion. A rear end portion of the first inflow portion 25 is continuous with a left end portion of the intermediate portion 24. A portion of the second inflow portion 26 other than a front end portion of the second inflow portion 26 extends in the front-rear direction and the front end portion is bent upward relative to the other portion. A rear end portion of the second inflow portion 26 is continuous with a right end portion of the intermediate portion 24. The third inflow portion 27 extends in the front-rear direction. A rear end portion of the third inflow portion 27 is continuous with a substantially central portion of the intermediate portion 24 in the right-left direction. The first inflow portion 25, the second inflow portion 26, and the third inflow portion 27 are configured so that their lengths in the front-rear direction are progressively shorter in that order.

The first air intake fan 20 is coupled to an upper end portion of the intake portion 23.

A lower end portion of the first intake pipe 21 is coupled to the first air intake fan 20. Therefore, when the first air intake fan 20 is rotated, cooling air is taken in through the first intake pipe 21 and the taken-in cooling air is forced to flow toward the first air intake duct 19.

The joint ducts 22, 22, and 22 provided for the first air intake duct 19 in this example are a first joint duct 22A, a second joint duct 22B, and a third joint duct 22C. The first joint duct 22A has a function of sending cooling air into the first battery module 3A, the second joint duct 22B has a function of sending cooling air into the second battery module 3B, and the third joint duct 22C has a function of sending cooling air into the third battery module 3C. The first joint duct 22A, the second joint duct 22B, and the third joint duct 22C are positioned in that order from front to rear.

The joint duct 22 includes a laterally elongated substantially rectangular coupling portion 28 and a connecting portion 29 protruding from the coupling portion 28. The joint duct 22 has therein a space. The coupling portion 28 is provided with protrusions 28a, 28a, . . . for air ejection that are protruded forward and spaced from each other at equal intervals in the right-left direction. Each protrusion 28a for air ejection has an open distal end.

A rear surface of the coupling portion 28 is a curved surface 28b whose intermediate portion in the vertical direction is protruded rearward.

The connecting portion 29 of the first joint duct 22A is protruded downward from a left end portion of the coupling portion 28 and coupled to the front end portion of the first inflow portion 25. The connecting portion 29 of the second joint duct 22B is protruded downward from a right end portion of the coupling portion 28 and coupled to the front end portion of the second inflow portion 26. The connecting portion 29 of the third joint duct 22C is protruded rearward from a central portion of the coupling portion 28 in the right-left direction and coupled to the front end portion of the third inflow portion 27.

Figure 6:
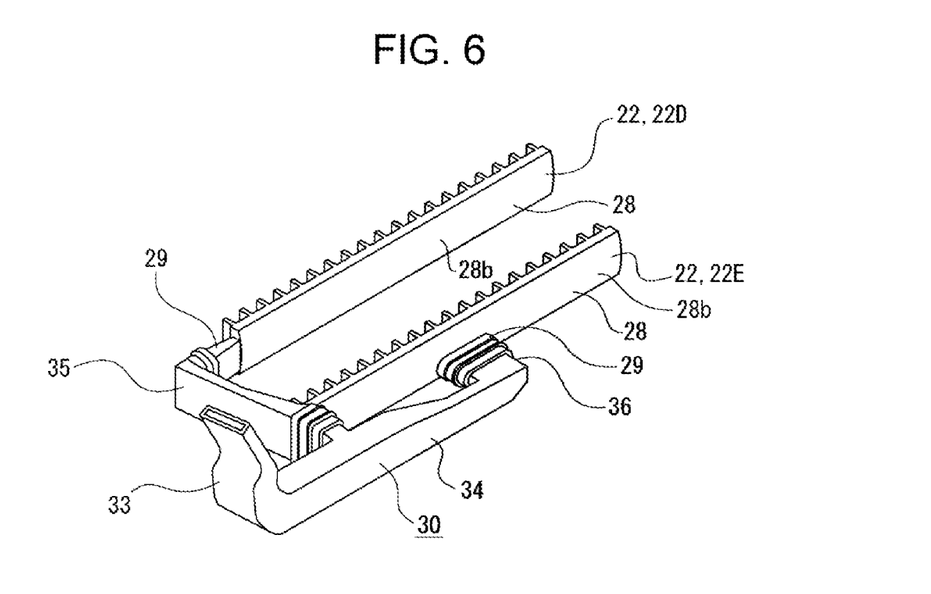
FIG. 6 is a perspective view of a second cooling unit.

The second air intake unit 18 includes a second air intake duct 30, a second air intake fan 31, a second intake pipe 32, and joint ducts 22, 22 (see FIGS. 1 and 6).

The second air intake duct 30 has a function of sending cooling air into the fourth battery module 3D and the fifth battery module 3E. The second air intake duct 30 includes an intake portion 33, an intermediate portion 34, a fourth inflow portion 35, and a fifth inflow portion 36.

The intake portion 33 is continuous with the intermediate portion 34. The intake portion 33 is located above, that is, at the upper side of, the intermediate portion 34. The intermediate portion 34 is positioned in a substantially horizontal posture at the rear side of an upper half of the housing case 2.

The intermediate portion 34 of the second air intake unit 18 is located at the upper side of the intermediate portion 24 of the first air intake unit 17. Therefore, the intermediate portion 24 and the intermediate portion 34 do not overlap each other when viewed in the front-rear direction, so that the onboard battery 1 can be reduced in size in the front-rear direction.

A portion of the fourth inflow portion 35 other than a front end portion of the fourth inflow portion 35 extends in the front-rear direction and the front end portion is bent rightward relative to the other portion. A rear end portion of the fourth inflow portion 35 is continuous with a left end portion of the intermediate portion 34. The fifth inflow portion 36 extends in the front-rear direction and a rear end portion thereof is continuous with a right end portion of the intermediate portion 34. The fourth inflow portion 35 is longer in the front-rear direction than the fifth inflow portion 36.

The second air intake fan 31 is coupled to an upper end portion of the intake portion 33.

A lower end portion of the second intake pipe 32 is coupled to the second air intake fan 31. Therefore, when the second air intake fan 31 is rotated, cooling air is taken in through the second intake pipe 32 and the taken-in cooling air is forced to flow toward the second air intake duct 30.

The joint ducts 22 and 22 provided for the second air intake duct 30 in this example are a fourth joint duct 22D and a fifth joint duct 22E. The fourth joint duct 22D has a function of sending cooling air into the fourth battery module 3D and the fifth joint duct 22E has a function of sending cooling air into the fifth battery module 3E. The fourth joint duct 22D is positioned more forward than the fifth joint duct 22E.

The connecting portion 29 of the fourth joint duct 22D is protruded leftward from a left end portion of the coupling portion 28 and coupled to the front end portion of the fourth inflow portion 35. The connecting portion 29 of the fifth joint duct 22E is protruded rearward from a central portion of the coupling portion 28 in the right-left direction and coupled to the front end portion of the fifth inflow portion 36.

For example, of the first inflow portion 25, the second inflow portion 26, the third inflow portion 27, the fourth inflow portion 35, and the fifth inflow portion 36 of the onboard battery 1, the first inflow portion 25 is provided with the largest inside diameter. Therefore, of the first inflow portion 25, the second inflow portion 26, the third inflow portion 27, the fourth inflow portion 35, and the fifth inflow portion 36, the first inflow portion 25 carries the largest flow of cooling air.

As for the first air intake unit 17, the first inflow portion 25, the second inflow portion 26, and the third inflow portion 27 are inserted from rear into the exhaust holes 7b, 7b, and 7b formed in the housing case 2. When the first inflow portion 25, the second inflow portion 26, and the third inflow portion 27 have been inserted in exhaust holes 7b, 7b, and 7b, a certain clearance gap is formed between an outer peripheral surface of each of the first inflow portion 25, the second inflow portion 26, and the third inflow portion 27 and an opening edge of a corresponding one of the exhaust holes 7b, 7b, and 7b. These clearance gaps allow air inside the housing case 2 to flow out of the housing case 2.

Figure 7:
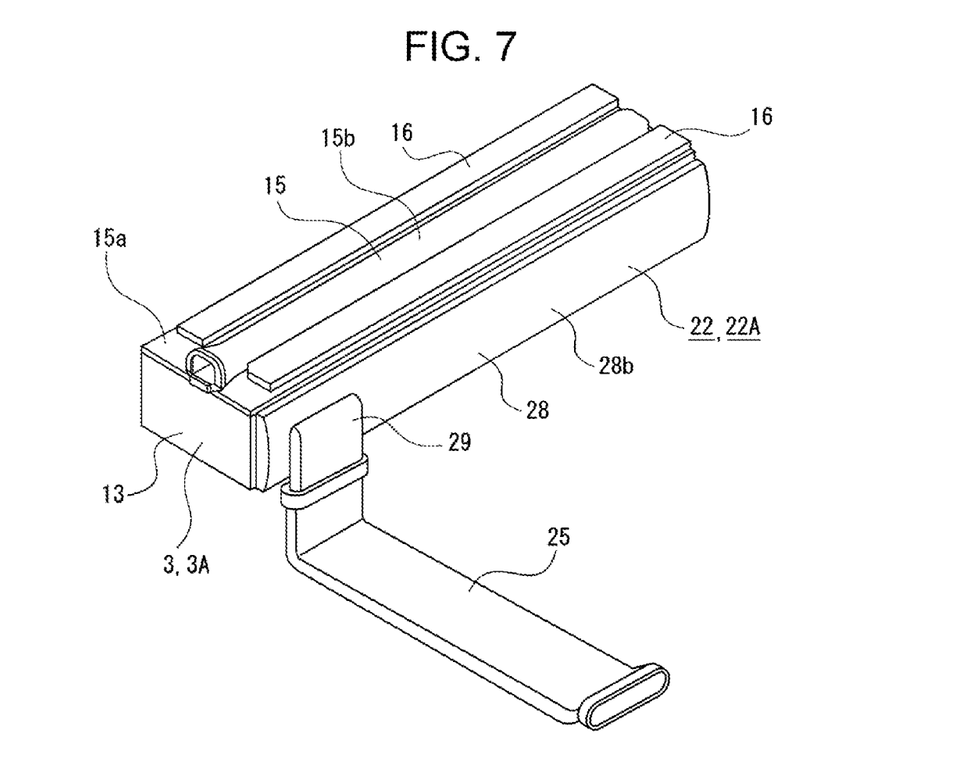
FIG. 7 is a perspective view of a first battery module and a first joint duct, illustrating, together with FIGS. 8 to 11, a battery module and a joint duct.

The coupling portion 28 of the first joint duct 22A is coupled to a rear end portion of the case body 10 of the first battery module 3A (see FIG. 7) and therefore positioned to face rear surfaces of the battery cells 11, 11, . . . . The first inflow portion 25 coupled to the first battery module 3A is positioned below the second battery module 3B and the third battery module 3C within the housing case 2.

Figure 8:
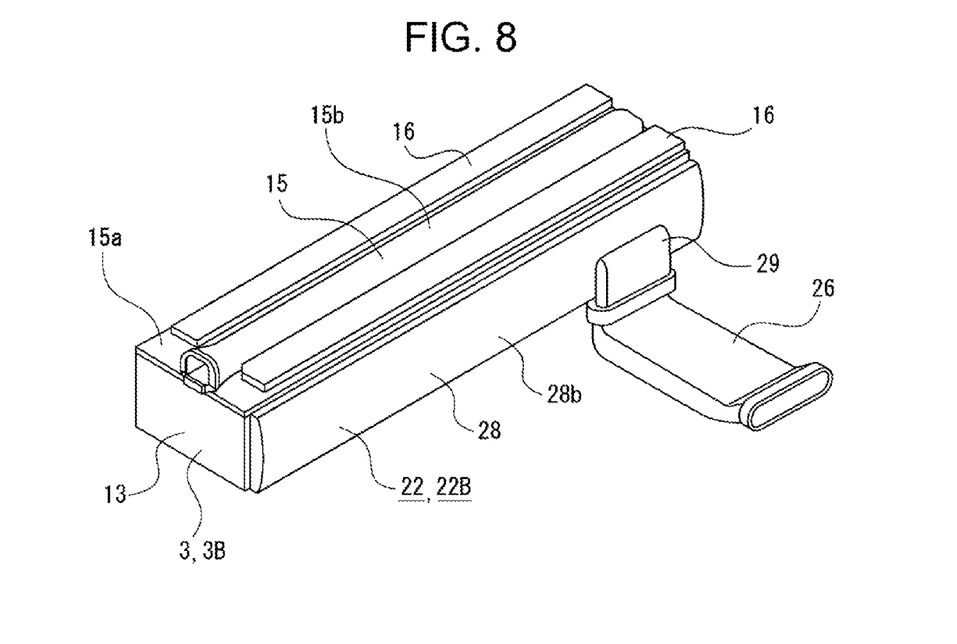
FIG. 8 is a perspective view of a second battery module and a second joint duct.

The coupling portion 28 of the second joint duct 22B is coupled to a rear end portion of the case body 10 of the second battery module 3B (see FIG. 8) and therefore positioned to face rear surfaces of the battery cells 11, 11, . . . . The second inflow portion 26 coupled to the second battery module 3B is positioned below the third battery module 3C within the housing case 2.

Figure 9:
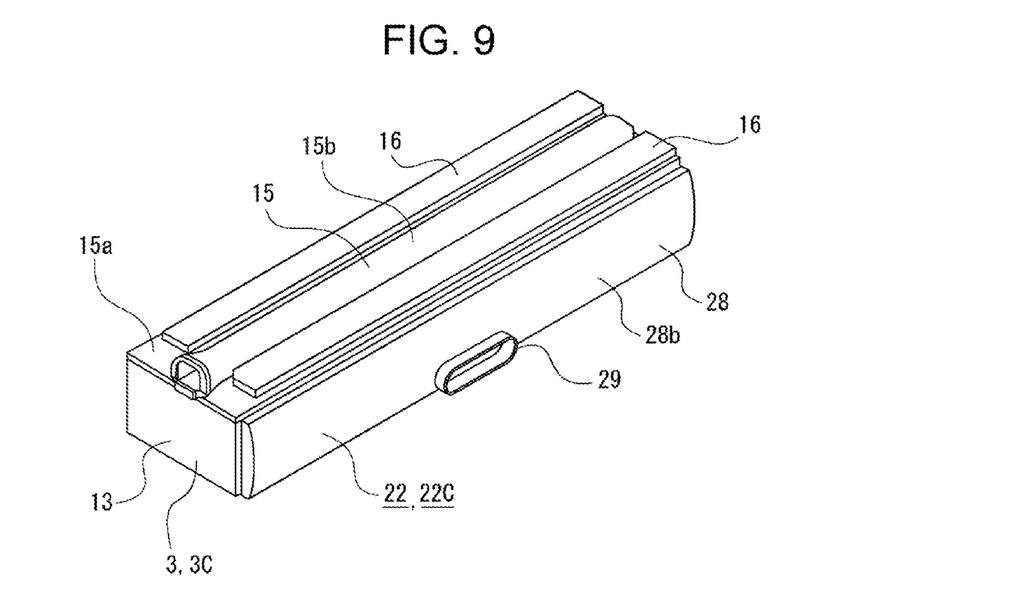
FIG. 9 is a perspective view of a third battery module and a third joint duct.

The coupling portion 28 of the third joint duct 22C is coupled to a rear end portion of the case body 10 of the third battery module 3C (see FIG. 9) and therefore positioned to face rear surfaces of the battery cells 11, 11, . . . .

Figure 10:
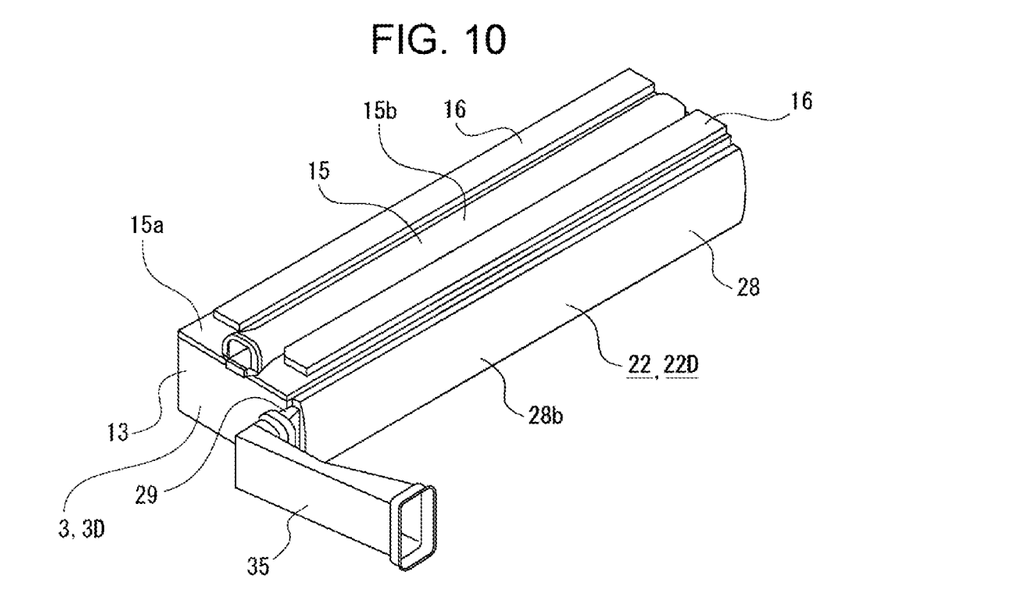
FIG. 10 is a perspective view of a fourth battery module and a fourth joint duct.

The coupling portion 28 of the fourth joint duct 22D is coupled to a rear end portion of the case body 10 of the fourth battery module 3D (see FIG. 10) and therefore positioned to face rear surfaces of the battery cells 11, 11, . . . . The fourth inflow portion 35 coupled to the fourth battery module 3D is positioned at the left side of the fifth battery module 3E within the housing case 2.

Figure 11:
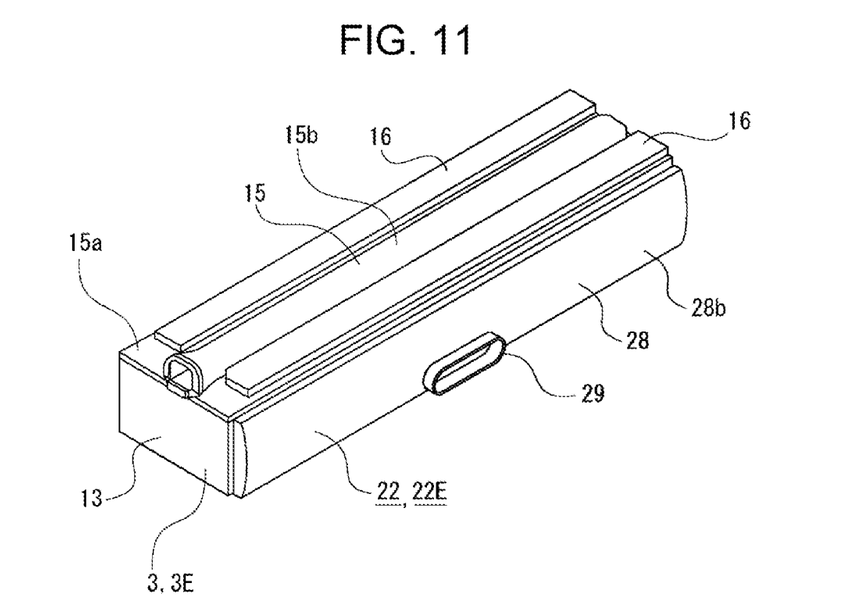
FIG. 11 is a perspective view of a fifth battery module and a fifth joint duct.

The coupling portion 28 of the fifth joint duct 22E is coupled to a rear end portion of the case body 10 of the fifth battery module 3E (see FIG. 11) and therefore positioned to face rear surfaces of the battery cells 11, 11, . . . .

As described above, the coupling portions 28, 28, . . . of the joint ducts 22, 22, . . . are each positioned to face the rear surfaces of the battery cells 11, 11, . . . of a corresponding one of the battery modules 3, 3, . . . . At this time, the protrusions 28a, 28a, . . . for air ejection of each coupling portion 28 are positioned between the battery cells 11, . . . . Therefore, cooling air ejected from the protrusions 28a, 28a, . . . for air ejection flows forward through gaps between the battery cells 11, 11, . . . .

Flow paths of cooling air will be described below.

When the first air intake fan 20 and the second air intake fan 31 are rotated, air present outside the housing case 2 is taken as cooling air via the first intake pipe 21 and the second intake pipe 32 into the first air intake duct 19 and the second air intake duct 30.

Cooling air taken into the first air intake duct 19 then flows from the intake portion 23 into the intermediate portion 24 and branches into the first inflow portion 25, the second inflow portion 26, and the third inflow portion 27. Branched cooling air is forced to flow toward the first joint duct 22A, the second joint duct 22B, and the third joint duct 22C and ejected into the first battery module 3A, the second battery module 3B, and the third battery module 3C.

Cooling air ejected into the first battery module 3A, the second battery module 3B, and the third battery module 3C flows forward passing through gaps formed between the battery cells 11, 11, . . . . Thus, cooling air cools the battery cells 11, 11, . . . . After flowing forward through the gaps between the battery cells 11, 11, . . . , cooling air is emitted into the internal space of the housing case 2 through release holes 12a, 12a, and 12a of the front surface portions 12, 12, and 12.

At this time, since the rear surface of the coupling portion 28 of the first joint duct 22A coupled to the first battery module 3A is the curved surface 28b whose intermediate portion in the vertical direction is protruded rearward, part (indicated by B1 in FIG. 3) of the cooling air emitted through the release hole 12a of the second battery module 3B is guided by the curved surface 28b so as to easily flow upward and then rearward.

Furthermore, the rear surface of the coupling portion 28 of the second joint duct 22B coupled to the second battery module 3B is the curved surface 28b whose intermediate portion in the vertical direction is protruded rearward, cooling air (indicated by C1 and C2 in FIG. 3) emitted from the release hole 12a of the third battery module 3C is guided by the curved surface 28b so as to easily flow upward or downward and then rearward.

On the other hand, cooling air taken into the second air intake duct 30 is forced to flow through the intake portion 33 into the intermediate portion 34 and then branched into the fourth inflow portion 35 and the fifth inflow portion 36. Branched cooling air flows toward the fourth joint duct 22D and the fifth joint duct 22E and then is ejected into the fourth battery module 3D and the fifth battery module 3E.

Cooling air ejected into the fourth battery module 3D and the fifth battery module 3E flows forward passing through gaps formed between the battery cells 11, 11, . . . . Thus, cooling air cools the battery cells 11, 11, After flowing forward through the gaps between the battery cells 11, 11, . . . , cooling air is emitted into the internal space of the housing case 2 from the release holes 12a and 12a of the front surface portions 12 and 12.

At this time, since the rear surface of the coupling portion 28 of the first joint duct 22A coupled to the first battery module 3A is the curved surface 28b whose intermediate portion in the vertical direction is protruded rearward, part (indicated by D2 in FIG. 3) of cooling air emitted from the release hole 12a of the fourth battery module 3D is guided by the curved surface 28b so as to easily flow downward and then rearward.

Furthermore, since the rear surface of the coupling portion 28 of the fourth joint duct 22D coupled to the fourth battery module 3D is the curved surface 28b whose intermediate portion in the vertical direction is protruded rearward, cooling air (indicated by E1 and E2 in FIG. 3) emitted from the release hole 12a of the fifth battery module 3E is guided by the curved surface 28b so as to easily flow upward or downward and then rearward.

Of the first battery module 3A, the second battery module 3B, the third battery module 3C, the fourth battery module 3D, and the fifth battery module 3E in the onboard battery 1, the first battery module 3A disposed at the most forward location emits the largest flow of cooling air into the internal space of the housing case 2.

Therefore, the cooling air emitted from the first battery module 3A to the internal space of the housing case 2 forms major exhaust paths within the housing case 2 (see FIG. 3). Because, within the housing case 2, a portion of the internal space other than both upper and lower end portions is provided with many component parts of the onboard battery 1, major exhaust paths are an upper side exhaust path F1 extending from a front side of the first battery module 3A through the upper side of the fourth battery module 3D and the fifth battery module 3E to the exhaust holes 7a and 7a formed in the rear portion 7 of the housing case 2 and a lower side exhaust path F2 extending from the front side of the first battery module 3A through the lower side of the second battery module 3B and the third battery module 3C to the exhaust holes 7b, 7b, and 7b formed in the rear portion 7.

Cooling air A1 having flown through the upper side exhaust path F1 is emitted mainly from the exhaust holes 7a and 7a to the outside of the housing case 2 while cooling air A2 having flown through the lower side exhaust path F2 is emitted mainly from the exhaust holes 7b, 7b, and 7b to the outside of the housing case 2.

Thus, in the onboard battery 1, the cooling air emitted from the first battery module 3A, which emits the largest flow of air, forms the upper side exhaust path F1 and the lower side exhaust path F2, which are major exhaust paths. Therefore, the cooling air emitted from each of the second battery module 3B, the third battery module 3C, the fourth battery module 3D, and the fifth battery module 3E mainly joins the flow moving through the upper side exhaust path F1 or the flow moving through the lower side exhaust path F2 and then flows out of the housing case 2.

That is, the cooling air D1 emitted from the fourth battery module 3D and flowing upward joins the flow moving through the upper side exhaust path F1 and then flows out of the housing case 2 and the cooling air E1 emitted from the fifth battery module 3E and flowing upward joins the flow moving through the upper side exhaust path F1 and then flows out of the housing case 2. Furthermore, the cooling air B2 emitted from the second battery module 3B and flowing downward joins the flow moving through the lower side exhaust path F2 and then flows out of the housing case 2 and the cooling air C2 emitted from the third battery module 3C and flowing downward joins the flow moving through the lower side exhaust path F2 and then flows out of the housing case 2.

Furthermore, each of the cooling air D2 emitted from the fourth battery module 3D and flowing downward, the cooling air E2 emitted from the fifth battery module 3E and flowing downward, the cooling air B1 emitted from the second battery module 3B and flowing upward, and the cooling air C1 emitted from the third battery module 3C and flowing upward mainly flows through an intermediate portion of the internal space of the housing case 2 in the vertical direction and then flows out of the housing case 2 through the exhaust holes 7a, 7a, 7b, 7b, and 7b.

Note that part of the cooling air emitted into the internal space of the housing case 2 from the first battery module 3A, the second battery module 3B, the third battery module 3C, the fourth battery module 3D, and the fifth battery module 3E flows through a right end portion or a left end portion of the internal space of the housing case 2 and then flows out of the housing case 2. However, the emission flow of cooling air that goes out of the housing case 2 after passing through the right end portion or the left end portion of the internal space of the housing case 2 is smaller than the emission flow of cooling air that goes out of the housing case 2 after passing through the upper side exhaust path F1, the lower side exhaust path F2, or the intermediate portion of the internal space of the housing case 2 in the vertical direction.

A flue gas duct 37 is disposed to the left of the battery modules 3, 3, . . . (see FIG. 2). The flue gas duct 37 has branched portions that are coupled to the tube-shaped portions 15b, 15b, . . . of the covers 15, 15, . . . that cover the case bodies 10, 10, . . . of the battery modules 3, 3, . . . . A distal end portion of the flue gas duct 37 is provided with an exhaust portion 38 whose distal end opening is formed as an exhaust opening 38a.

Gas produced at the time of abnormality occurring in any one of the battery cells 11, 11, . . . is guided via a corresponding one of the tube-shaped portions 15b, 15b, . . . of the covers 15, 15, . . . to the exhaust portion 38 of the flue gas duct 37 and is emitted out of the housing case 2 through the exhaust opening 38a.

In the internal space of the housing case 2, junction boxes 39 and 40 that function as a control device that controls the battery modules 3, 3, . . . are positioned side by side in the right-left direction at the upper side of the first battery module 3A and the front side of the fourth battery module 3D.

A region in the internal space of the housing case 2 in which the junction boxes 39 and 40 are disposed is exposed to inflow of part of the cooling air that has been ejected from the joint ducts 22, 22, . . . and has cooled the battery cells 11, 11, . . . of the battery modules 3, 3, . . . , so that such inflowing cooling air cools the junction boxes 39 and 40.

In a right end portion of the internal space of the housing case 2 there are disposed an auxiliary appliance 41 and a control unit (not illustrated) that are aligned in the vertical direction. The auxiliary appliance 41 is an appliance for charging the onboard battery 1 when the vehicle is not running, for example, at night. The control unit controls the entire onboard battery 1.

Part of the cooling air having cooled the battery cells 11, 11, . . . flows into a region in the internal space of the housing case 2 in which the auxiliary appliance 41 is disposed and therefore cools the auxiliary appliance 41 and the control unit.

As described above, in the onboard battery 1, at least two of the battery modules 3, 3, . . . are disposed apart from each other in the vertical direction and at least two of the battery modules 3, 3, . . . are disposed apart from each other in the front-rear direction. The rear portion 7 of the housing case 2 is provided with the exhaust holes 7a, 7a, 7b, 7b, and 7b. Furthermore, the emission flows of cooling air emitted from the battery modules 3, 3, . . . to the internal space of the housing case 2 are set so that the emission flow from the first battery module 3A is the largest.

Therefore, a major exhaust path is formed in which cooling air taken in from rear is emitted from the first battery module 3A to the internal space of the housing case 2 at the largest emission flow of all the five battery modules 3A to 3E and, in the internal space of the housing case 2, cooling air moves from the first battery module 3A toward the exhaust holes 7a, 7a, 7b, 7b, and 7b. This makes it easier for cooling air emitted from the second battery module 3B, the third battery module 3C, the fourth battery module 3D, and the fifth battery module 3E to flow through the exhaust path extending from the first battery module 3A toward the exhaust holes 7a, 7a, 7b, 7b, and 7b and secures smooth emission of cooling air. Thus, the efficiency in cooling the battery cells 11, 11, . . . can be improved.

Furthermore, the first battery module 3A is disposed at the most forward location, the fourth battery module 3D and the second battery module 3B are disposed in the upper tier and the lower tier, respectively, at the rear side of the first battery module 3A, and the first battery module 3A is disposed in the intermediate tier in the vertical direction.

Therefore, since the emission flow of cooling air from the first battery module 3A disposed in the intermediate tier is set the largest, it is easy for the cooling air emitted from the first battery module 3A to split into upper and lower flows, so that the cooling air smoothly flows inside the housing case 2. Thus, the cooling air can be even more smoothly emitted from the exhaust holes 7a, 7a, 7b, 7b, and 7b.

The five battery modules 3, 3, . . . are disposed in such a manner that the fifth battery module 3E and the third battery module 3C are disposed in the upper tier and the lower tier, respectively, in rear of the fourth battery module 3D and the second battery module 3B that are disposed in the upper tier and the lower tier, respectively.

Therefore, due to the arrangement in which battery modules 3, 3, . . . are disposed in the upper tier and the lower tier at an intermediate location and the most rearward location in the front-rear direction and one battery module 3 is disposed in the intermediate tier at the most forward location, cooling air can be caused to smoothly flow inside the housing case 2 and smoothly go out through the exhaust holes 7a, 7a, 7b, 7b, and 7b while generation of sufficient electric power is allowed.

Furthermore, of the plurality of exhaust holes 7a, 7a, 7b, 7b, and 7b provided, at least two exhaust holes are positioned apart from each other in the vertical direction.

Therefore, the cooling air caused to flow through the upper side exhaust path F1 inside the housing case 2 and the cooling air caused to flow through the lower side exhaust path F2 are emitted mainly through the upper exhaust holes 7a and 7a and the lower exhaust holes 7b, 7b, and 7b, respectively, so that emission of cooling air out of the housing case 2 can be smoothly carried out.

Furthermore, the front surface portions 12, 12, . . . of the battery modules 3, 3, . . . are provided with release holes 12a, 12a, . . . for emitting cooling air into the internal space of the housing case 2. End portions of the first air intake duct 19 and the second air intake duct 30 are provided as the coupling portions 28, 28, . . . that are coupled to the rear end portions of the battery modules 3, 3, . . . and the rear surfaces of the coupling portions 28, 28, . . . are formed as the curved surfaces 28b, 28b, . . . whose intermediate portions in the vertical direction are protruded rearward.

Therefore, at least part of the cooling air emitted from the release holes 12a, 12a, . . . of the second battery module 3B, the third battery module 3C, the fourth battery module 3D, and the fifth battery module 3E is easily guided by the curved surfaces 28b, 28b, . . . to flow upward or downward and then rearward, so that cooling air can be more smoothly emitted through the exhaust holes 7a, 7a, 7b, 7b, and 7b.

Note that the curved surfaces 28b and 28b of the third battery module 3C and the fifth battery module 3E also have a shape whose intermediate portion in the vertical direction is protruded rearward. Therefore, the cooling air passing through the upper side exhaust path F1, the lower side exhaust path F2, and an intermediate portion of the internal space of the housing case 2 in the vertical direction is easily guided to flow upward or downward, by the curved surfaces 28b and 28b of the third battery module 3C and the fifth battery module 3E, so that cooling air can be smoothly emitted through the exhaust holes 7a, 7a, 7b, 7b, and 7b.

In addition, the front end portion of the housing case 2 has at locations above and below the first battery module 3A the upper inclined portion 6b and the lower inclined portion 6c that become farther apart from each other in the vertical direction toward the rear, more specifically, with increasing distance toward the rear.

Therefore, since the cooling air emitted from the first battery module 3A is caused to flow rearward along the upper inclined portion 6b and the lower inclined portion 6c, the cooling air caused to split into the upper and lower separate flows can be caused to smoothly flow rearward within the housing case 2.

Note that, in the onboard battery 1, cooling air is taken into the battery modules 3, 3, . . . from rear via the first air intake duct 19 and the second air intake duct 30, and that the second battery module 3B and the fourth battery module 3D are disposed in the lower tier the and upper tier, the third battery module 3C and the fifth battery module 3E are disposed in a pair of lower and upper tiers, and the first battery module 3A is disposed at the most forward location.

Therefore, the most forward location, where temperature is likely to become the highest, is provided with only the first battery module 3A instead of two or more battery modules, so that the effect of heat produced by the other battery modules 3, 3, . . . on the first battery module 3A is reduced. Hence, the efficiency in cooling the battery modules 3, 3, . . . can be improved and the temperature increase due to heat produced by the battery cells 11, 11, . . . can be reduced.

Furthermore, since the first battery module 3A disposed most forward is disposed in the intermediate tier relative to the battery modules 3, 3 disposed in the upper tier and the lower tier, the effect of heat produced by the battery modules 3, 3, . . . positioned more rearward than the first battery module 3A on the first battery module 3A becomes further less, so that the temperature increase due to heat produced by the battery cells 11, 11, . . . can be further reduced.

Although in the above-illustrated example, the five battery modules 3, 3, . . . are disposed, it suffices that the number of battery modules 3 disposed within the housing case 2 is at least three and that, of the at least three battery modules 3, at least two battery modules 3, 3 are disposed in a pair of upper and lower tiers and at least one battery module 3 is disposed at the most forward location.

Figure 12:
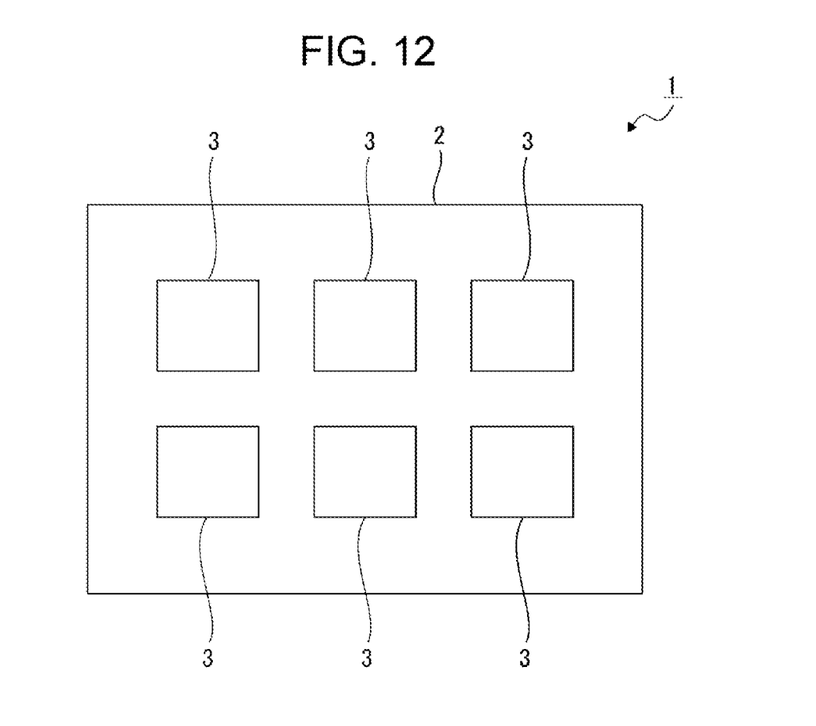
FIG. 12 is a conceptual diagram illustrating an example of an onboard battery in which two battery modules are disposed at a most forward location.

For example, an arrangement in which two battery modules 3, 3 are disposed in a pair of upper and lower tiers at the most forward location may be adopted (see FIG. 12). In this arrangement, of the emission flows of cooling air emitted from the battery modules 3, 3, . . . to the internal space of the housing case 2, the emission flow emitted from one of the two battery modules 3, 3 disposed most forward or the emission flows emitted from the two battery modules 3, 3 disposed most forward are set the largest.

Furthermore, although in the foregoing example, the exhaust holes 7a, 7a, 7b, 7b, and 7b are provided, the number of exhaust holes formed in the rear portion 7 of the housing case 2 is not limited to five but it suffices that at least one exhaust hole is formed in the rear portion 7.

However, in order to improve the efficiency in emitting out of the housing case 2 cooling air caused to flow through the upper side exhaust path F1 and the lower side exhaust path F2, it is desirable that at least one upper exhaust hole and at least one lower exhaust hole be provided apart from each other in the vertical direction.

The invention claimed is:

1. An onboard battery comprising:
   battery modules in each of which a battery cell is disposed;
   a housing case that houses the battery modules; and
   an air intake duct configured to send cooling air into the battery modules,
   wherein, of the battery modules, at least two are disposed apart from each other in a vertical direction and at least two are disposed apart from each other in a front-rear direction,
   wherein cooling air is taken into the battery modules from rear sides thereof via the air intake duct,
   wherein cooling air taken into the battery modules is emitted to an internal space of the housing case,
   wherein a rear portion of the housing case is provided with at least one exhaust hole configured to let out the cooling air emitted from the battery modules to the internal space of the housing case, and
   wherein, of emission flows of the cooling air emitted from the battery modules to the internal space of the housing case, an emission flow of the cooling air emitted from a forward position battery module of the battery modules which is disposed at a most forward position in the front-rear direction is the largest
   the onboard battery further comprises a major exhaust path that is formed to carry the emission flow of the forward position battery module.

2. The onboard battery according to claim 1, wherein the forward position battery module of the battery modules is disposed most forward,
   wherein two of the battery modules are disposed in an upper tier and a lower tier at a rear side of the forward position battery module, and
   wherein the forward position battery module is disposed in an intermediate tier in the vertical direction.

3. The onboard battery according to claim 2, wherein
   the battery modules comprise five battery modules, and
   wherein at the rear side of the two battery modules disposed in the upper tier and the lower tier, two of the battery modules are disposed in an upper tier and a lower tier.

4. The onboard battery according to claim 1, wherein
   the at least one exhaust hole comprises a plurality of exhaust holes, and
   wherein at least two of the exhaust holes are positioned apart from each other in the vertical direction.

5. The onboard battery according to claim 2, wherein
   the at least one exhaust hole comprises a plurality of exhaust holes, and
   wherein at least two of the exhaust holes are positioned apart from each other in the vertical direction.

6. The onboard battery according to claim 3, wherein
   the at least one exhaust hole comprises a plurality of exhaust holes, and
   wherein at least two of the exhaust holes are positioned apart from each other in the vertical direction.

7. The onboard battery according to claim 1, wherein
   front surface portions of the battery modules are each provided with a release hole configured to emit the cooling air to the internal space of the housing case,
   wherein one end portions of the air intake duct are provided as coupling portions coupled to rear end portions of the battery modules, and
   wherein a rear surface of each of the coupling portions is provided as a curved surface whose intermediate portion in the vertical direction is protruded rearward.

8. The onboard battery according to claim 2, wherein
   front surface portions of the battery modules are each provided with a release hole configured to emit the cooling air to the internal space of the housing case,
   wherein one end portions of the air intake duct are provided as coupling portions coupled to rear end portions of the battery modules, and
   a rear surface of each of the coupling portions is provided as a curved surface whose intermediate portion in the vertical direction is protruded rearward.

9. The onboard battery according to claim 3, wherein
   front surface portions of the battery modules are each provided with a release hole configured to emit the cooling air to the internal space of the housing case,
   wherein one end portions of the air intake duct are provided as coupling portions coupled to rear end portions of the battery modules, and
   wherein a rear surface of each of the coupling portions is provided as a curved surface whose intermediate portion in the vertical direction is protruded rearward.

10. The onboard battery according to claim 4, wherein
    front surface portions of the battery modules are each provided with a release hole configured to emit the cooling air to the internal space of the housing case,
    wherein one end portions of the air intake duct are provided as coupling portions coupled to rear end portions of the battery modules, and
    wherein a rear surface of each of the coupling portions is provided as a curved surface whose intet mediate portion in the vertical direction is protruded rearward.

11. The onboard battery according to claim 5, wherein
    front surface portions of the battery modules are each provided with a release hole configured to emit the cooling air to the internal space of the housing case,
    wherein one end portions of the air intake duct are provided as coupling portions coupled to rear end portions of the battery modules, and
    wherein a rear surface of each of the coupling portions is provided as a curved surface whose intermediate portion in the vertical direction is protruded rearward.

12. The onboard battery according to claim 6, wherein
    front surface portions of the battery modules are each provided with a release hole configured to emit the cooling air to the internal space of the housing case,
    wherein one end portions of the air intake duct are provided as coupling portions coupled to rear end portions of the battery modules, and
    wherein a rear surface of each of the coupling portions is provided as a curved surface whose intermediate portion in the vertical direction is protruded rearward.

13. The onboard battery according to claim 1, wherein
    a front end portion of the housing case has, at locations above and below the forward position battery module, inclined portions that become farther apart from each other in the vertical direction toward rear.

14. The onboard battery according to claim 2, wherein
    a front end portion of the housing case has, at locations above and below the forward position battery module, inclined portions that become farther apart from each other in the vertical direction toward rear.

15. The onboard battery according to claim 3, wherein a front end portion of the housing case has, at locations above and below the forward position battery module, inclined portions that become farther apart from each other in the vertical direction toward rear.

16. The onboard battery according to claim 4, wherein a front end portion of the housing case has, at locations above and below the forward position battery module, inclined portions that become farther apart from each other in the vertical direction toward rear.

17. The onboard battery according, to claim 5, wherein a front end portion of the housing case has, at locations above and below the forward position battery module, inclined portions that become farther apart from each other in the vertical direction toward rear.

18. The onboard battery according to claim 6, wherein a front end portion of the housing case has, at locations above and below the forward position battery module, inclined portions that become farther apart from each other in the vertical direction toward rear.

19. The onboard battery according to claim 1, wherein the housing case includes a housing portion located at a forward position of the housing case and providing the major exhaust path,
wherein the housing portion includes:
a front portion;
a rear portion disposed in a rear of the front portion;
side portions disposed apart from each other in a right-left direction;
a bottom portion that faces in the vertical direction; and
an intermediate portion of the front portion in the vertical direction that is provided as a flat portion that faces in the front-rear direction,
wherein a portion of the front portion above the flat portion includes an upper inclined portion that is inclined so as to extend farther rearward with increasing distance upward from the flat portion, and
wherein a portion below the flat portion is provided as a lower inclined portion that is inclined so as to extend farther rearward with increasing distance downward from the flat portion.

20. The onboard battery according to claim 1, wherein the housing case includes curved surfaces that guide the emission flow carried by the major exhaust path rearward in the front-rear direction.

* * * * *